United States Patent
Raffel (12)

(10) Patent No.: US 6,223,042 B1
(45) Date of Patent: *Apr. 24, 2001

(54) METHOD OF INTELLIGENT ROAMING USING NETWORK INFORMATION

(75) Inventor: Michael Allen Raffel, Redmond, WA (US)

(73) Assignee: AT&T Wireless Services Inc, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/883,111

(22) Filed: Jun. 26, 1997

(51) Int. Cl.[7] .................................................. H04Q 7/38
(52) U.S. Cl. .................. 455/455; 455/62; 455/161.1; 455/419; 455/432; 455/435
(58) Field of Search .................................. 455/422, 432, 455/433, 434, 435, 62, 455, 456, 516, 161.1

(56) References Cited

U.S. PATENT DOCUMENTS

| | | |
|---|---|---|
| 4,788,543 | 11/1988 | Rubin . |
| 4,903,320 | 2/1990 | Hanawa . |
| 4,916,728 | 4/1990 | Blair . |
| 5,020,091 | 5/1991 | Kropp et al. . |
| 5,101,500 | 3/1992 | Marui . |
| 5,159,625 | 10/1992 | Zicker . |
| 5,203,015 | 4/1993 | George . |
| 5,276,905 | * 1/1994 | Hurst et al. ........................... 455/432 |
| 5,404,355 | 4/1995 | Raith . |
| 5,406,643 | 4/1995 | Burke et al. . |
| 5,412,375 | 5/1995 | Wood . |
| 5,420,908 | 5/1995 | Hodges et al. . |
| 5,479,484 | 12/1995 | Mukerjee et al. . |
| 5,483,684 | 1/1996 | Ono et al. . |
| 5,504,803 | 4/1996 | Yamada et al. . |
| 5,509,052 | 4/1996 | Chia et al. . |

(List continued on next page.)

FOREIGN PATENT DOCUMENTS

| | | |
|---|---|---|
| 2115877 | 11/1994 | (CA) . |
| 0 459 344 A1 | 12/1991 | (EP) . |
| 0 510 322 A2 | 10/1992 | (EP) . |
| 0779754 | 6/1997 | (EP) . |
| 0781064 | 6/1997 | (EP) . |
| 2257334 | 1/1993 | (GB) . |
| 96/39787 | 12/1996 | (WO) . |
| 97/16938 | 5/1997 | (WO) . |

OTHER PUBLICATIONS

International Search Report dated Nov. 19, 1998 for International Application No. PCT/US 98/12266 filed Jun. 12, 1998.

Primary Examiner—Lee Nguyen

(57) ABSTRACT

A wireless communication device identifies a preferable wireless service provider in a multi-service provider environment using a search schedule based on information gathered by the wireless telecommunications network. The information may be related to prior registrations of the said devices or of other devices. The information may be used to establish the last location of the said device to within a cell and to project the likely location of the device when next powered up. Based on this information, an optimal search schedule may be designed, either in the network or outside of the network, and used by the device on the next power-up. The information or the search schedule may be downloaded to the device either over the air or manually. Additionally, the user may transmit to the network specific information on the user's next location and that information may be combined with other information gathered by the network in the design of a new search schedule for the next power-up of the device. The information or search schedule provided to the device may be changed dynamically to reflect changes in the location of the device or in prior usage history.

56 Claims, 8 Drawing Sheets

U.S. PATENT DOCUMENTS

| | | |
|---|---|---|
| 5,513,242 | 4/1996 | Mukerjee et al. . |
| 5,513,247 | 4/1996 | Mukerjee et al. . |
| 5,442,806 | 8/1995 | Barber et al. . |
| 5,463,675 | 10/1995 | Gerszberg . |
| 5,517,677 | 5/1996 | Moon . |
| 5,524,135 | 6/1996 | Mizikovsky et al. . |
| 5,541,977 | 7/1996 | Hodges et al. . |
| 5,586,338 | 12/1996 | Lynch et al. . |
| 5,590,397 | 12/1996 | Kojima . |
| 5,603,084 | 2/1997 | Henry, Jr. et al. . |
| 5,613,204 | 3/1997 | Haberman et al. . |
| 5,613,208 | 3/1997 | Blackman et al. . |
| 5,655,218 | 8/1997 | Smolinske . |
| 5,711,001 | 1/1998 | Bussan et al. . |
| 5,734,980 | 3/1998 | Hooper et al. . |
| 5,754,542 | 5/1998 | Ault et al. . |
| 5,754,952 | 5/1998 | Hodges et al. . |
| 5,761,618 * | 6/1998 | Lynch et al. ................... 455/419 |
| 5,768,380 | 6/1998 | Rosauer et al. . |
| 5,790,952 | 8/1998 | Seazholtz et al. . |
| 5,832,367 * | 11/1998 | Bamburak et al. ................. 455/434 |
| 5,845,198 | 12/1998 | Bamburak et al. . |
| 5,905,955 | 5/1999 | Bamburak et al. . |

\* cited by examiner

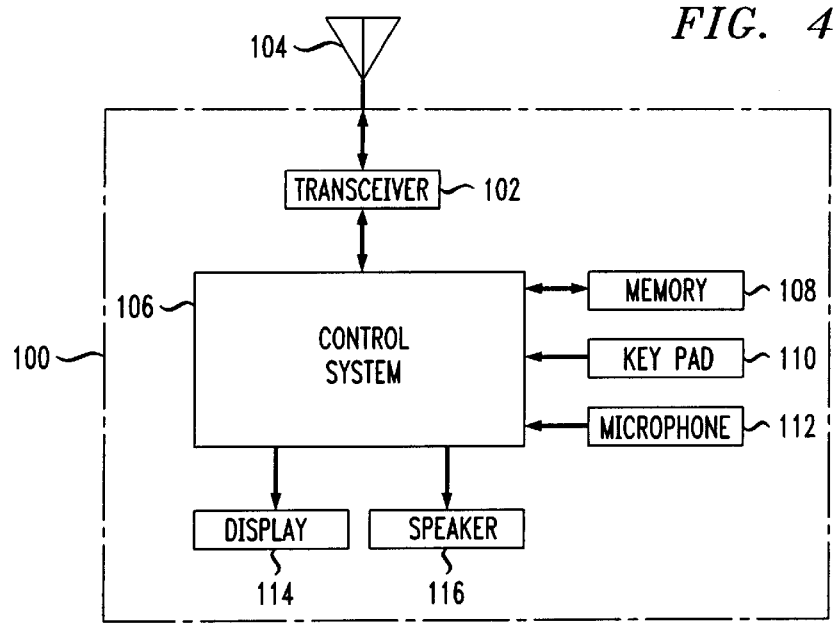
FIG. 4
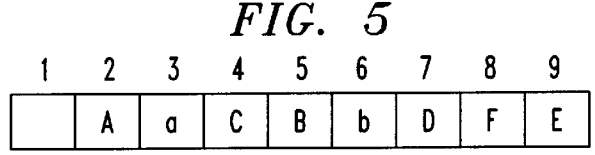
FIG. 5
FIG. 6
| PRIORITY | FREQUENCY | COUNTER |
|---|---|---|
| 1 | | |
| 2 | A | 100 |
| 3 | a | 45 |
| 4 | C | 32 |
| 5 | B | 15 |
| 6 | b | 12 |
| 7 | D | 10 |
| 8 | F | 0 |
| 9 | E | 0 |

| PRIORITY | SOC | SID | SID | | SID | SID |
|---|---|---|---|---|---|---|
| OPT | 001 | 43 | 57 | ... | 21 | 62 |
| 1 | 011 | 42 | 28 | ... | 52 | 68 |
| 2 | 100 | 45 | 23 | ... | 54 | 77 |
| ⋮ | ⋮ | ⋮ | ⋮ | | ⋮ | ⋮ |
| N | 111 | 49 | 24 | ... | 53 | 70 |
| PROHIBIT | 101 | 52 | 27 | ... | 50 | 75 |

METHOD OF INTELLIGENT ROAMING USING NETWORK INFORMATION

CROSS-REFERENCE TO RELATED APPLICATIONS

This application is related to the following commonly assigned U.S. patent applications which are hereby incorporated by reference: 1) Ser. No. 08/570,905 filed Dec. 12, 1995, entitled "A Method For Selecting A Wireless Communications Service Provider In A Multi-Service Provider Environment"; 2) Ser. No. 08/570,904 filed Dec. 12, 1995, entitled "A Method For Selecting A Preferable Wireless Communications Service Provider In A Multi-Service Provider Environment"; 3) Ser. No. 08/570,903 filed Dec. 12, 1995, entitled "A Method For Selecting A Wireless Communications Service Provider In A Multi-Service Provider Environment Using a Geographic Database"; 4) Ser. No. 08/570,902 filed Dec. 21, 1995, entitled "Powered Down Selection of a Preferable Wireless Communications Service Provider In A Multi-Service Provider Environment"; 5) Ser. No. 08/672,902 filed Jun. 28, 1996, entitled "Method For Categorization of Multiple Service Providers In A Wireless Service Communication Environment"; and 6) Ser. No. 08/672,907 filed Jun. 28, 1996, entitled "Method For Optimal Selection Among Multiple Service Providers In A Wireless Service Communication Environment".

FIELD OF THE INVENTION

This invention relates to wireless communications and, more particularly, to the selection of a particular service provider in a multi service-provider environment.

BACKGROUND OF THE INVENTION

In a multi service-provider wireless communication environment, such as a cellular network, multiple service providers may operate in a given geographic area, for example, a metropolitan area. Each service provider will have its own "geographic network" in that area, and will be assigned a unique operational "frequency" (which may comprise multiple frequencies, or a frequency band) for that geographic area. The service providers may have other geographic networks in other geographic areas. However, in those other geographic areas the service providers may be assigned different operational frequencies.

The invention relates to how a subscriber's cellular phone selects, and "registers onto", a particular range of operating frequencies (or "frequency band"), such as, for example, the frequency band assigned to the subscriber's selected service provider, in the geographic area in which the subscriber's cellular phone happens to be located and operating. (In this patent, the term "cellular phone" refers to a wireless, mobile phone that operates in a multi service-provider environment, usually a cellular environment. The term "registers onto" includes not only the processes involved in establishing a call, but also includes any communication between the network and wireless communication device, such as, for example, when the device is in standby mode. In particular, these "registrations" may give the network information, for example, on the location of the device.)

In early versions of cellular phones, the subscriber's phone would be pre-programmed so that on being turned on, i.e., "powered-up", the phone would operate at a pre-selected band, or would implement a pre-programmed search schedule to find a particular operating frequency band in accordance with the pre-programmed schedule. For example, the schedule might call for seeking service on a particular band and, if no service could be found on that band, the schedule might call for seeking service from non-preferred providers located on other bands. In later devices the pre-programmed schedule in the phone could be manually altered by the user.

However, it should be recognized that in these early implementations the number of possible bands were few and there were only a small set of hailing frequencies, sometimes called "control frequencies". Accordingly, in implementing a search schedule, all of the control channels could be scanned in a relative short period of time. However, as many more frequencies became available, many more control channels would have to be scanned to implement search schedules. This is a time consuming process, and consumers will not tolerate the associated delay on power up.

To address this intensified problem of searching rapidly for available appropriate frequencies, more efficient search protocols were devised to enable the subscriber's phone to search, efficiently and rapidly, through the various available operational frequencies for one assigned to the subscriber's service provider, or, in the absence of its service provider in the specific geographic area, for one assigned to a service provider with whom the subscriber's service provider had a "partnering" arrangement. (Such protocols usually have to be implemented whenever the phone is powered-up, even when in its home area, because the phone does not know that it is in its home area until it has found a channel that is broadcasting its home area identities. However, since the purpose of such search protocols is to enable more effective roaming operation, the protocols are called "roaming" schedules, even though they are most often implemented in the subscriber's home area, where the subscriber is not technically "roaming". It should be noted that with the ability to "roam"—i.e., operate outside one's home area, the "wireless network" is broadened to include all networks on which the subscriber may get service.)

This invention involves "intelligent roaming"—improved techniques for subscriber selection of an optimum service provider when the subscriber's phone is powered-up, whether in the subscriber's home area or while roaming. The invention is an improved technique for intelligent roaming and is best understood in the context of the frequency band allocation used in current wireless communications. FIG. 1 illustrates a portion of the radio frequency spectrum used today in such wireless communications. Frequency range 10, centered around 800 MHz, has historically been known as the cellular frequency range. Frequency range 12, centered about 1900 MHz, is a more recently established frequency range associated with personal communication services (PCS). Each range of frequencies, i.e., the cellular and PCS, are broken into two portions; an uplink portion, that is used for communications from a mobile communication device to a base station such as a cellular base station, and a downlink portion, that is used for communications from the base station to a mobile communication device. In cellular frequency range 10, the uplink portion is labeled 14, and the downlink portion is labeled 16. In the PCS frequency range, 12, the uplink portion is labeled 18 and the downlink portion is labeled 20.

Each of the frequency ranges is broken into bands which are typically associated with different service providers. For example, in the U.S., the FCC has allocated frequencies and frequency bands within its jurisdiction as described in the present application. But other nations, for example the UK or China, may have regulators that have determined a different frequency allocation for their cellular and PCS bands. In the case of cellular frequency range 10, frequency bands 30 and 32 are designated band "a" for uplink and downlink communications, respectively. In a particular geographic area, a cellular service provider is assigned frequency band "a" for use in mobile communications. Likewise, in the same geographic area another cellular service provider is assigned frequency bands 34 (uplink) and 36 (downlink) which are designated band "b". The frequency ranges assigned to the two service providers are sufficiently separated so as to not interfere with each other, thereby enabling the two separate service providers to offer service in the same geographic area.

Recently, the US Government auctioned the PCS frequency spectrum to service providers. As with the cellular frequency range, the PCS frequency range is broken into several bands with different service providers licensed to use different frequency bands within a particular geographical area. The PCS bands are referred to as A, B, C, D, E and F. The A band includes uplink band 50 and downlink band 52. The B band includes uplink band 54 and downlink band 56. Band C includes uplink band 58 and downlink band 60. Each uplink and downlink band of the A, B and C bands is approximately 30 MHz wide. The D band includes uplink band 62 and downlink band 64. The E band includes uplink band 66 and downlink band 68. Likewise, band F includes uplink band 70 and downlink band 72. The uplink and downlink bands of bands D, E and F are approximately 10 MHz wide each. It should be noted that in the combined cellular and PCS frequency bands, it is possible to have as many as eight different wireless communication service providers in a particular area.

Each of the different cellular and PCS bands consist of control channels and communication channels in both the uplink and downlink direction. In the case of analog cellular bands, there are 21 control channels for both the "a" and "b" bands. Each of the control channels include an uplink and a downlink portion. The control channels transmit information such as a SOC (System Operator Code), a SID (System Identifier Code), paging information, call setup information, and other overhead information, such as information relating to registering with the mobile communication system. The portion of the cellular band's spectrum not occupied by the control channels is used for communication channels. Communication channels carry, for example, voice or data communications. As noted above, each channel consists of an uplink and downlink communications link.

Presently there are several cellular communication standards. An analog standard known as EIA/TIA 553 was built upon the AMPS (Advanced Mobile Phone Service) standard. This standard supports 21 analog control channels (ACC) and several hundred analog voice or traffic channels (AVC). A newer standard is the EIA/TIA IS54B standard which supports dual mode operation. Dual mode operation refers to having an analog control channel, and either an analog voice/traffic channel or a digital voice/traffic channel (DTC). The AVC or DTC are used for actual communications, and the ACC is used to transfer information relating to, for example, call set-ups, service provider identification, and the other overhead or system information.

A newer standard, the EIA/TIA IS 136 standard supports communications covered by both analog and dual mode cellular, and also includes a totally digital communication scheme which was designed for the PCS frequency bands A–F and cellular frequency bands "a" and "b". This standard allows for a digital traffic channel (DTC) and a digital control channel (DCCH). In the case of the DTC, not only is the voice or data communicated, but in addition, a digital channel locator (DL) is transmitted in the DTC. The DL enables a mobile communication device that locks onto the DTC to use the information in the DL to locate a DCCH for purposes of obtaining information such as the SOC, SID, paging information, or other system overhead information carried on the digital control channel.

When a mobile communication device such as a mobile telephone attempts to register with the service provider, it locks onto a control channel and reads information such as the SOC and SID. If the SOC and/or SID correspond to a service provider with which the user has a communication services agreement, the telephone may register with the service provider's mobile communication system via the uplink control channel.

FIG. 2 illustrates different service-provider assignments in different parts of the United States. The Figure is a map of the United States illustrating assignments in cities such as Seattle, Chicago and Washington, DC. In Seattle, for example, frequency band A has been licensed to SOC (Service Operator Code) 001 with a SID of 43 and band C has been licensed to SOC 003 with a SID of 37. In Chicago, suppose that frequency band C has been licensed to SOC 001 with a SID of 57, and that band B has been licensed to SOC 003 with a SID of 51. In Washington, DC suppose that frequency band "a" has been licensed to a SOC 001 with a SID of 21, and that band A has been licensed to SOC 003 with a SID of 17. It should be noted that the same SOC may be found in several different locations although on different frequency bands. It should also be noted that the same SOC will be associated with different SIDs in each geographical area and that in the same geographic area different service providers have different SIDs. If a particular subscriber to a wireless telecommunication service has an agreement with a service provider having a SOC of 001, that subscriber would prefer to use systems with a SOC of 001 because the subscriber is likely to receive a less expensive rate. When the subscriber is in Seattle he/she would prefer to be on band A, and if in Chicago on band C, and if in Washington, DC on band "a".

The above described situation presents a problem for a wireless communication service subscriber. As a subscriber moves from one area of the country to another, the telephone, when turned on, searches for the "home" service provider, or a service provider with which the subscriber has a pre-arranged agreement. If, for example, the subscriber travels from Seattle to Chicago, then when the phone is turned on for the first time in Chicago, the phone will search through the different bands of the spectrum to identify the service operator with the code 001 in order to find the desired service provider.

In order to find a particular service provider, the phone may have to search through both the "a" and "b" cellular bands, and through the six PCS bands. It should be recalled that there are up to 21 different ACCs in each of the "a" and "b" cellular bands. It may be necessary to check 42 ACCs in order to find an ACC from which a SOC or SID may be obtained. Additionally, searching for a particular SOC or SID in PCS bands A through F is particularly time consuming, because, within a particular PCS band, the digital control channels (DCCHs), which contain the SOC and SID, are not assigned to specific frequencies. As a result, the mobile communication device may find it necessary to search through the spectrum of each PCS band looking for a DCCH, or an active DTC that has a digital channel locator (DL) which will direct the mobile communication device to the DCCH. Accordingly, the process of searching for a particular service provider is laborious and may require a period of time on the order of several minutes.

In the related applications cited above there are disclosed intelligent roaming techniques in which a particular search schedule is used to optimize the search for a preferred service provider. In some of the disclosed intelligent roaming techniques, the improved roaming search "schedule may be reprogrammed using signals received over the wireless communication channel" or based on "the prior history of the mobile communication device's use." Additionally, as disclosed in U.S. patent application Ser. No. 08/597,066 filed Feb. 5, 1996 entitled "Roaming Authorization System", a subscriber defined profile may be stored at the Home Location Register. Roaming authorization is then only granted consistent with permitted roaming time-windows in that profile.

SUMMARY OF INVENTION

This invention is an improved intelligent roaming technique in which information gathered by the wireless network is used to formulate an optimal search schedule. The invention contemplates the use of the types of information that are currently gathered by the network to design optimal intelligent roaming search schedules. Of course, additional information, that the network may be designed to gather in the future, may also be used in the practice of this invention. Based on the invention an optimum search schedule can be "adaptively" predicted based on information gathered by the network.

In accordance with one aspect of this invention, the information that may be used to design intelligent roaming search schedules may be related to the usage history of the particular subscriber. For example, the network will know that when the particular subscriber is near the local airport the next location for that particular subscriber is usually a specific distant city to which the subscriber, in fact, often flies. A search schedule that takes into account the frequency assignments of service providers in the specific distant city will then be used.

In accordance with another aspect of this invention, the information that may be used to design intelligent roaming search schedules may be related not only to the usage history of the particular subscriber but to the usage history of other subscribers as well. For example, the network will know that subscribers on a particular interstate highway, when reaching a service boundary, will most often make their next call from the adjacent service area. A search schedule that takes into account the frequency assignment of service providers in the adjoining areas will then be used. Similarly, in other embodiments of the invention, information related to the usage history of subsets of subscribers may be used to design efficient search schedules. In these and other embodiments of the invention, information gathered by the network permits more rapid selection of an optimum service-provider in a multi service-provider environment. Access to the network for this process not only provides information that is not usually available to the subscriber for designing search schedules, but, additionally, may help overcome storage and processing limitations of mobile communication devices.

The invention will be better understood, by recognizing that the information that is used to design the search schedule for a specific subscriber generally falls into two broad classes. First there is information related to the subscriber's last registration on the system. This information includes subscriber location as well as information related to the specific provider used during the last registration and the services sought. A second class of information relates to projecting where the subscriber will be at the next power-up. This information relates to past practices of the specific subscriber, as well as past practices of other subscribers or subsets of subscribers. This "projection" information can be analyzed based on many variables, such as last location of the subscriber, last call made by the subscriber, time of day and year, recent movement of the subscriber, historical practices of the specific subscriber, etc.

Although in the broad practice of this invention the search schedule is designed based on information gathered in the network, the schedule itself need not be designed in the network. Accordingly, in some embodiments of the invention, the search schedule may be designed in the subscriber phone, but based on the network information Of course, in other embodiments, the search schedule may be designed in a network element, or in a non-network element removed from the phone, and transferred to the phone over-the-air, or otherwise. In either event, the network information, or the specific search schedule may be transferred to the mobile phone either over-the-air or manually.

In view of the limited memory available in the phone, the search schedule may be updated periodically depending on the projected location of the phone. Accordingly, for example, certain bands may be removed from the search schedule based on the projected location of the phone. Alternatively, the user may indicate to the network the location of the phone, and based on the network information related to that new location, a search schedule customized for that location may be used.

BRIEF DESCRIPTION OF THE DRAWINGS

The accompanying drawings, listed below, illustrate preferred embodiments of the invention, and, together with the description, serve to explain the principles of the invention.

FIG. 4 is a block diagram of a mobile communication device;

FIG. 5 illustrates a search schedule;

FIG. 6 illustrates a search schedule ordered by registration history;

DETAILED DESCRIPTION

In describing the invention, we first describe the general characteristics of a wireless network, then we review roaming concepts, and finally we discuss embodiments specific to this invention.

As discussed above, the following examples in this disclosure are directed to the U.S. allocation of spectrum. However, the basic concepts of the present invention are applicable where other nations' regulators may have different frequency allocations for their wireless networks. In this regard, the following description should not be construed as limited by being discussed in depth in the context of the frequency spectrum allocated by the FCC in the United States.

General Characteristics of a Wireless Network

Figure 3:
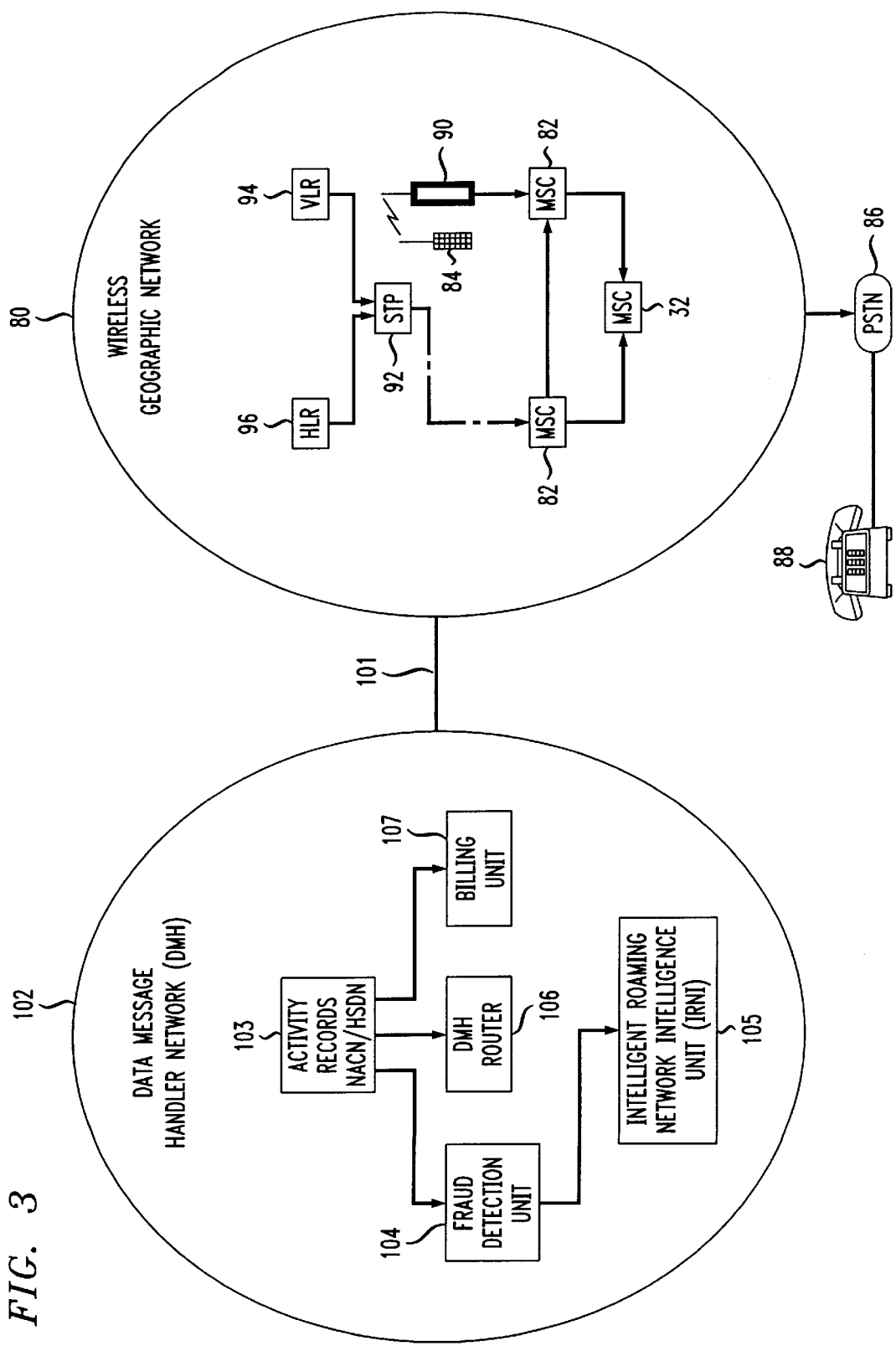
FIG. 3 illustrates a telecommunications system including wireless and wired networks.

A Wireless Geographic Communications Network, 80, such as a Public Cellular Network, that services a specific geographic area, is illustrated in FIG. 3. The Nationwide Wireless Network comprises a multitude of such Wireless Geographic Communications Networks. The current Nationwide Wireless Network also comprises some form of Data Message Handler Network, connected to the Wireless Geographic Networks, to handle data related to calls made on the Nationwide Network. An advanced form of such a Data Message Handler Network, 102, is also shown in FIG. 3. (The term "wireless network" as used in this patent refers to the aggregation of networks that may have information useful in designing a search schedule for a particular mobile device.)

The Wireless Geographic Network generally comprises a plurality of Mobile Switching Centers (MSC), 82, (also known as Mobile Telephone Switching Offices (MTSO)) that are connected to one another. MSC, 82, is in communication with, and operates to process calls (e.g., switching, handing off, terminating, originating, signaling, etc.) involving, at least one mobile station or device, 84. The mobile station, 84, may be a conventional mobile cellular telephone or another type of wireless communication device.

A wired communications network, 86, such as the Public Switched Telephone Network (PSTN), generally comprises a plurality of conventional switches that are interconnected to enable originating station, 88, from which a call is placed, to communicate with other stations within or outside PSTN, 86. The originating station, 88, illustrated in FIG. 3, may be a conventional telephone or any other communication device connected to PSTN, 86.

Although the wireless telecommunications network, 80, need not be limited to cellular networks, conventional cellular technology may be utilized to allow the same frequencies of a common allocated radio bandwidth to be reused in separated local areas or cells of a broader region. Each cell is served by a base transceiver station, 90, which communicates with a plurality of local transceivers, 84, one of which is shown. The base stations, 90, are interconnected via MSCs, 82, which are also connected to PSTN, 86, either individually, or through another MSC, as shown in FIG. 3. The base station, 90, and mobile stations, 84, communicate via radio connections. The base station, 90, may be connected to an MSC, 82, via trunks that comprise, for example, wires, radio links or optical fiber, to carry the voice, or other data, and control messages, between mobile station, 84, and MSC, 82. As illustrated in FIG. 3, MSC, 82, is also connected to PSTN, 86, to allow wireless stations, 84, of wireless network, 80, to communicate with wired stations of PSTN, 86, such as telephone, 88. While not illustrated, MSC, 82, may also be connected to integrated services digital networks (ISDN) for communicating according to the protocols of ISDN.

The wireless telecommunication network, 80, typically comprises many units that need to communicate signaling information for controlling connections, which signaling information may relate to call establishment, re-establishment (hand off), dis-establishment (tear down) and maintenance (power control and other processes). Such signaling information is typically communicated over channels separate from the channels carrying actual voice or data communications between the customers being connected. Among the units that need to communicate are the mobile station, 84, the base station, 90, connected by radio to the mobile station, 84, MSC, 82, and the various databases that are consulted for the establishment, maintenance and control of mobile calls, including the home location register (HLR), 96, and the visitor location register (VLR), 94, which are accessed through a conventional signal transfer point (STP), 92.

The home location register (HLR) contains data for a mobile customer. The data stored in the HLR is the permanent data that is independent of the customer's present location, plus temporary data such as location-related data and the addresses of Service Centers that have stored short messages for a mobile station. These addresses are erased after the short messages have been delivered. The HLR also indicates the Signaling System 7 (SS7) point code or other address for the network element that contains the VLR currently associated with the mobile station. The VLR contains current data for each mobile customer, including that customer's mobile station's present or most recently known area, the station's on/off status, and security parameters.

The components mentioned above may all communicate with a Data Message Handler Network (DMH), 102, which collects information to form activity records for the network. These records include information related to every call made on the wireless network. The information in these records may include identification of the subscriber, the calling party, and the called party; the subscriber location at time of the call; the date, time and duration of the call, detailed information related to hand-offs, etc. This information is routed by the DMH Router, 106, to, for example, a billing unit, 107, that creates the subscriber bills, and to a fraud detection unit, 104, that analyzes usage patterns to detect fraud. As discussed further below, in one aspect of the invention, this information is also used by an Intelligent Roaming Network Intelligence Unit (IRNI), 105. The IRNI unit may obtain information from the fraud unit or may obtain it directly from the activity records database. This information may then be transmitted to the subscriber's mobile device, either with or without further processing, to be used, in accordance with this invention, to optimize the process by which the transceiver selects a service-provider in a multi service-provider environment.

Each mobile is typically assigned a "home" network. Accordingly, at any given time, a particular mobile may be located either in its home network or "roaming" in a "visiting" network. The visiting network detects the presence of roaming mobiles and informs their home networks of the location of the roaming mobiles. The home network is responsible for communicating to the visiting network signaling information, including, for example, permissions to grant communication privileges to the roaming mobiles and a list of features to which the roaming mobiles subscribe.

FIG. 4 illustrates a block diagram of a mobile communication device such as a cellular telephone or personal communication device. Mobile communication device, 100, includes transceiver, 102, which sends and receives signals from antenna, 104. Mobile communication device, 100, is controlled by control system, 106, which may include a microprocessor or a microcomputer. Control system, 106, uses memory, 108, for storing programs that are executed and for storing information that is entered by the user, the distributor, the communication services provider or the manufacturer. Information such as user preferences, user telephone numbers, preferred service provider lists and frequency search schedules are stored in memory, 108. Memory, 108, may include storage devices such as random access memory (RAM), read only memory (ROM) and/or programmable read only memory (PROM). A user communicates with control system, 106, via keypad, 110. Control system, 106, communicates information to the user via display, 114. Display, 114, may be used to display information such as status information and items such as telephone numbers entered via keypad, 110. Audio information to be transmitted from the mobile communication device, 100, is received via microphone, 112, and audio communications received by mobile communication device, 100, are played to the user via speaker, 116.

Intelligent Roaming Techniques

After initially powering-up, a mobile communication device locates a service provider and registers with the service provider. The registration process allows the identity of a mobile and its location to be given to its home network so that the home network can deliver, and bill for, calls initiated, or to be received, by the mobile, whether the mobile is in its home region or roaming.

Figure 1:
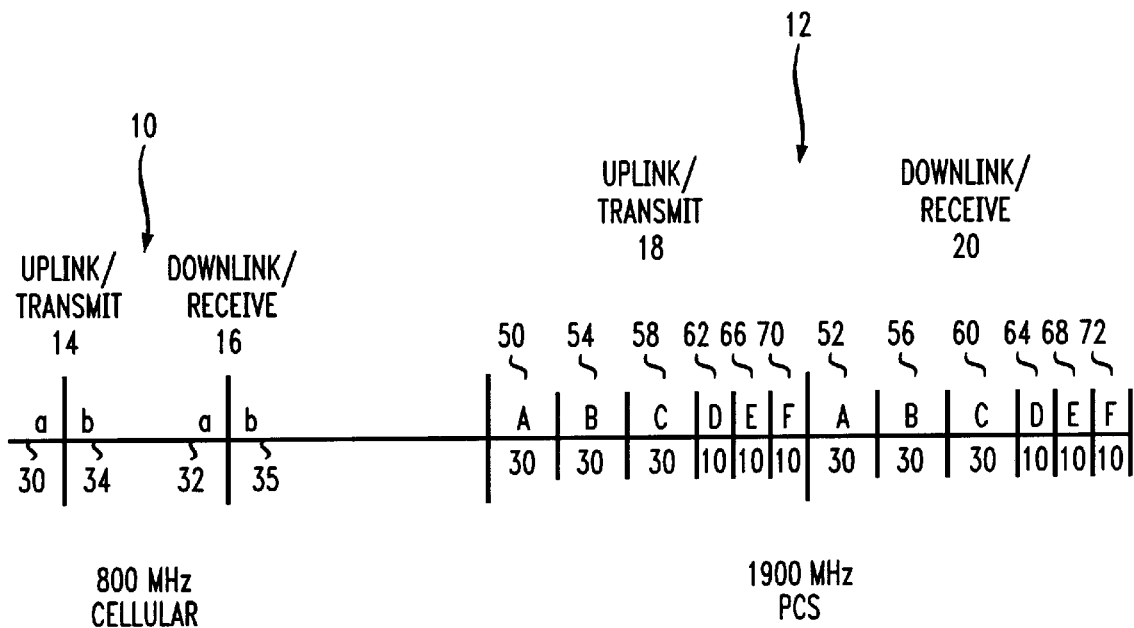
FIG. 1 illustrates the frequency spectrum used for wireless communications.
Figure 2:
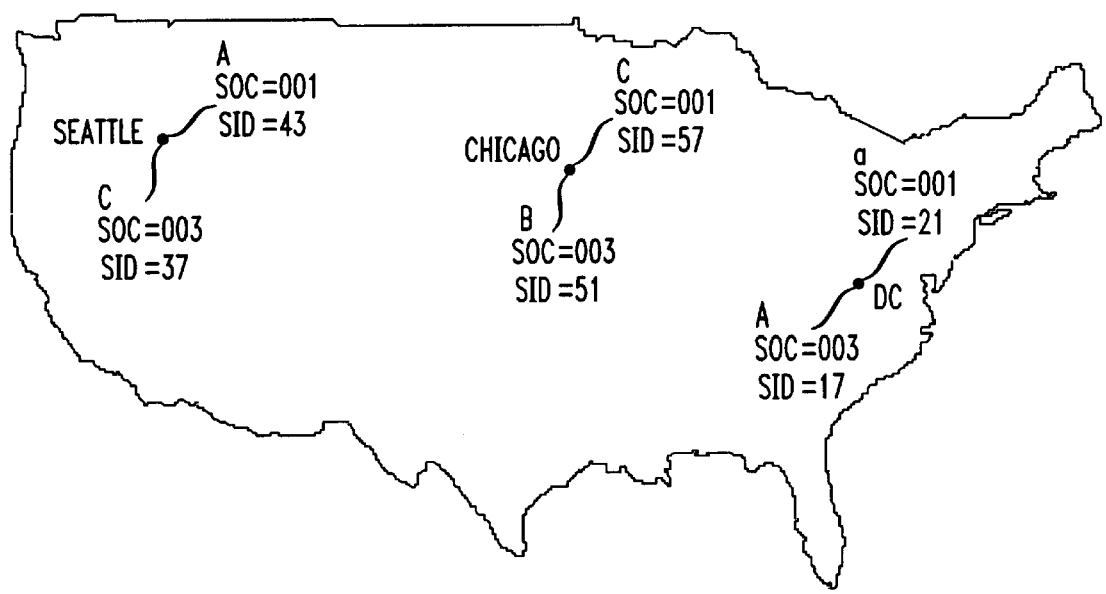
FIG. 2 illustrates service areas within the United States.

As part of the registration process, a service provider must be selected. Recalling FIG. 1, service providers are located at a plurality of frequency bands across the radio spectrum. In order to find a service provider, the communication device searches the spectrum to identify available service providers. The communications device examines received service provider codes e.g., SOCs (Service Operator Codes) and/or SIDs (System Identification Codes) to determine whether available service providers are optimal, preferred or prohibited service providers.

Figure 9:
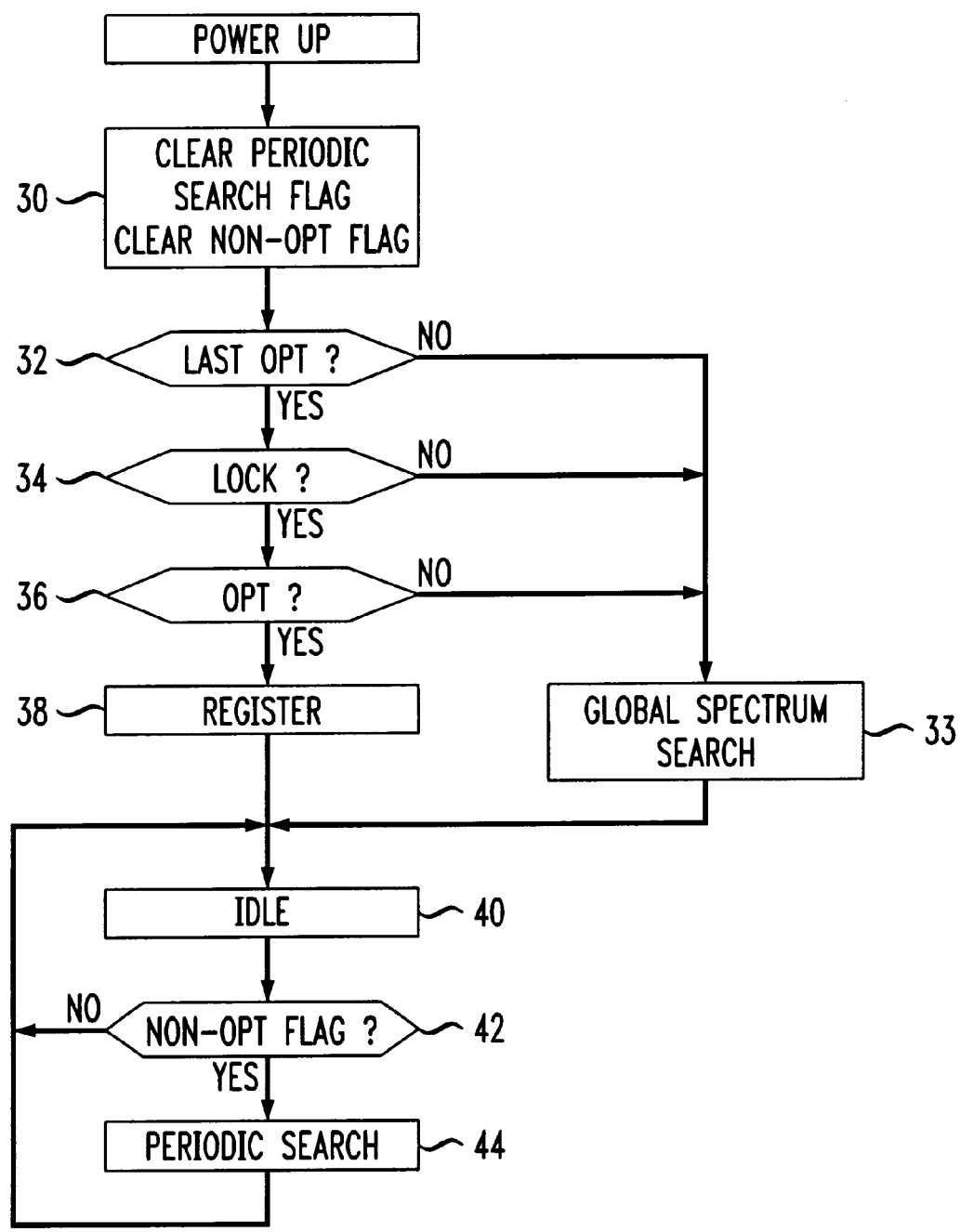
FIG. 9 is a flow chart illustrating a spectrum search routine.

FIG. 9 illustrates a process or program that control system 106 may execute in order to find a desirable service provider, After power-up, step 30 is executed to initialize a non-optimal flag by clearing the flag. Step 32 determines whether the last service provider, that is, the service provider used before the last power down, was an optimal service provider. This is determined by checking the SOC and/or SID of the last service provider and determining whether that service provider's SOC or SID corresponds to the SOC or SID of an optimal service provider. The SOC or SID of the last service provider and a list of optimal and preferred service providers is stored in memory 16. If in step 32 it is determined that the prior service provider was not optional, a global spectrum search is executed If the last service provider was optional, step 34 is executed where system 104 attempts to lock onto the control signal of the service provider. If the lock is unsuccessful, which may indicate that the control channel is no longer available or out of range, the global spectrum search is executed. If a lock is successful, step 36 is executed. In step 36, it is determined whether the control channel contains the SOC or SID of an optimal service provider. Once again, this is determined by comparing the SOC or SID from the control signal with a list of optimal service provider SOCs or SIDs. If the SOC or SID does not belong to that of an optimal service provider 1 the global spectrum search 33 is executed and the identity of the frequency band in which the non-optimal SOC or SID was located is passed to global search routine 33 so as to avoid unnecessarily searching this portion of the spectrum again. If in step 36 it is determined that an optimal service provider has been located, step 38 registers communication device 100 with the service provider.

In FIG. 9, step 40 is an idle state where control system 106 simply monitors the control channel of the service provider for communication system overhead information and for paging information which may indicate an incoming communication. While in idle state 40, a timer is activated which permits a low-duty cycle search to be performed if the phone is presently registered in a non-optimal service provider system. This situation may arise if global spectral search 33 provides a preferred but not optimal service provider. Periodically, such as every 5 minutes, step 42 is executed to determine whether the non-optimal flag has been set, if the non-optima flag is not set, control system 106 returns to idle step 40. If the non-optimal has been set, step 42 leads to the execution of periodic search routine 44, where a search is conducted in order to attempt to locate an optimal service provider. If periodic search routine 44 produces an optimal service provider, the non-optimal service provider flag is cleared and the mobile communication device registers with the optimal service provider. The mobile communications device then enters an idle state by executing step 40. If an optimal service provider is not located in routine 44, control system 106 returns to an idle state by executing step 40.

Figure 10:
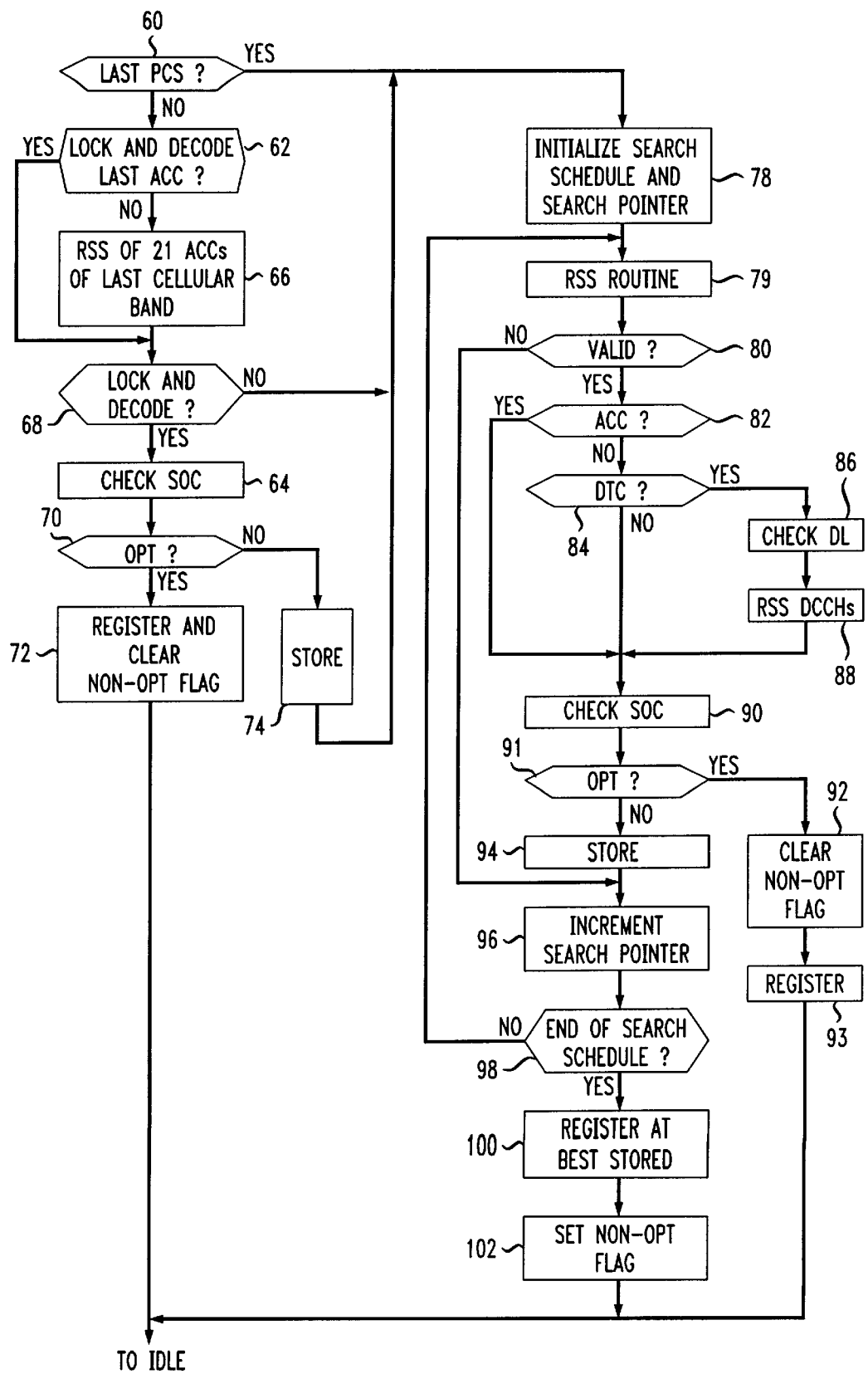
FIG. 10 is a flow chart illustrating the global spectrum search routine.

FIG. 10 illustrates a flowchart of global spectrum search routine 33 which is executed by control system 106. At step 60 it is determined whether the last control channel used by the mobile communication device was a personal communication services related control channel, that is, a control channel in the bands A through F. If the last control channel was not a PCS control channel, step 62 is executed. In step 62 it is determined whether the mobile communication device can lock onto, or receive and decode the last ACC (Analog Control Channel) that was used. If the mobile communication device can successfully look onto the last ACC, step 64 is executed. If the communication device cannot lock onto the last ACC, step 66 is executed. In step 66, an RSS (Received Signal Strength Scan) is performed. This step involves the mobile communication device tuning to each of the 21 ACCs associated with the cellular band of the last used ACC, and attempting to lock onto the strongest received signal. In step 68, it is determined whether a lock has been achieved. In step 68 if a lock is not obtained, a predetermined search schedule is executed in order to find a service provider. If in step 72 a lock is obtained, step 64 is executed where the SOC or SID obtained from the control channel is compared to a list of optimal SOCs or SIDs. In step 70, if the received SOC or SID is associated with an optimal service provider, step 72 is executed where the mobile communication device clears the non-optimal flag, registers with the communication service provider, and then enters an idle state by executing step 40 of FIG. 9. If in step 70 it is determined that an optimal service provider SOC or SID was not received, step 74 is executed, where the identity of the frequency band just searched is stored in memory 16.

Step 78 is executed after step 74, after 69 if a lock is not obtained, or after step 60 if the last control signal was from a PCS frequency band. In step 78, a search schedule is downloaded using a master search schedule. When downloading the search schedule in step 78, frequency bands previously searched are removed from the downloaded schedule so as to avoid searching bands that have already been searched. For example, bands searched in the search routine discussed with regard to FIG. 9, and the cellular band search discussed with regard to step 74, are removed from the search schedule.

After the modified search schedule has been loaded, a search pointer is initialized to point to the first band identified by the modified search schedule. The first band identified on the modified schedule is searched with regard to received signal strength (RSS) in step 79's RES routine. In the case of bands "a" and "b", the ACC with the strongest signal is selected. In the case of the PCS bands, that is the bands A through F, 2.55 MHz sections of each band are searched in 30 kilohertz steps. The mobile communication device tunes to the strongest signal that crosses a minimum threshold, e.g., −110 dBm, within the 2.5 MHz band being examined. In step 80 it is determined whether the signal is valid, that is, conforms to one of the above mentioned standards. If it is not valid, the search pointer is incremented in step 96, and if the signal is valid, step 82 is executed.

In step 82 it is determined whether the signal is an ACC. If the signal is an ACC, the SOC or SID is decoded in step 90. If the signal is not an ACC, step 84 determines whether the received signal is a digital traffic channel (DTC) or a digital control channel (DCCH). If the signal is an DCCH the SOC or STD is extracted in step 90. If it is determined that the received signal is a DTC, step 86 is executed where the DL (digital channel locator) is extracted in step 88, the mobile communication device tunes to the strongest DCCH of the digital control channels identified by the DL. In step 90, the SOC or SID of the received DCCH is extracted and in step 91, it is determined whether the SOC or SID is associated with an optimal service provider. If the SOC or SID is associated with an optimal service provider, step 92 clears the non-optimal flag and step 96 registers the mobile communication device with the service provider. After step 96, the communication device enters the idle state in step 40 of FIG. 4.

If in step 92 it is determined that the SOC or SID does not belong to that of an optimal service provider, step 94 is executed, where the SOC or SID is stored in memory 16 indicating whether the SOC or SID was at least a preferred, rather than an undesirable or prohibited, service provider with the spectral location of the SOCs or SIDs control channel. In step 96 the search pointer that identifies the band being searched is advanced to identify the next band in the schedule for searching.

In step 98 it is determined whether the pointer has reached the end of the search schedule. If the end of the search schedule has not been reached, step 82 is executed to perform another received signal strength search routine as discussed above, and if the last frequency band has been searched, step 100 is executed. In step 100 the mobile communication device registers with the best stored SOC or SID, that is, a SOC or SID that has at least been associated with a preferred service provider. The best service provider can be identified by comparing the -stored SOCs or SIDs with a list of preferred SOCs or SIDs. The list of preferred SOCs or SIDs. can include the optimal SOC(s) or SID(s) and a prioritized list of preferred SOCs or SIDs where the higher priority will get preference for registration. The listing also includes undesirable or prohibited SOC(s) or SID(s) that are used only in emergencies (e.g., 911 calls) or if the user enters an override command. After registering with the service provider in step 100, step 102 is executed to set the non-optimal flag, and then step 40 of FIG. 9 is executed where the mobile communication device enters the idle state.

It should be noted that the searching operation of FIGS. 9 and 10 may be carried out in a simplified manner. With regard to FIG. 9, control system 106 may execute step 33 after step 30 while always skipping steps 32, 34, 36 and 38. With regard to FIG. 10, control system 106 may start the global spectrum search with step 78 while always skipping steps 60–74.

It should also be noted that each frequency band is composed of frequencies within each band. The search schedule can be a list of frequency bands or a list of frequencies. The frequencies are examined using the searching operation of FIGS. 9–12.

Figure 11:
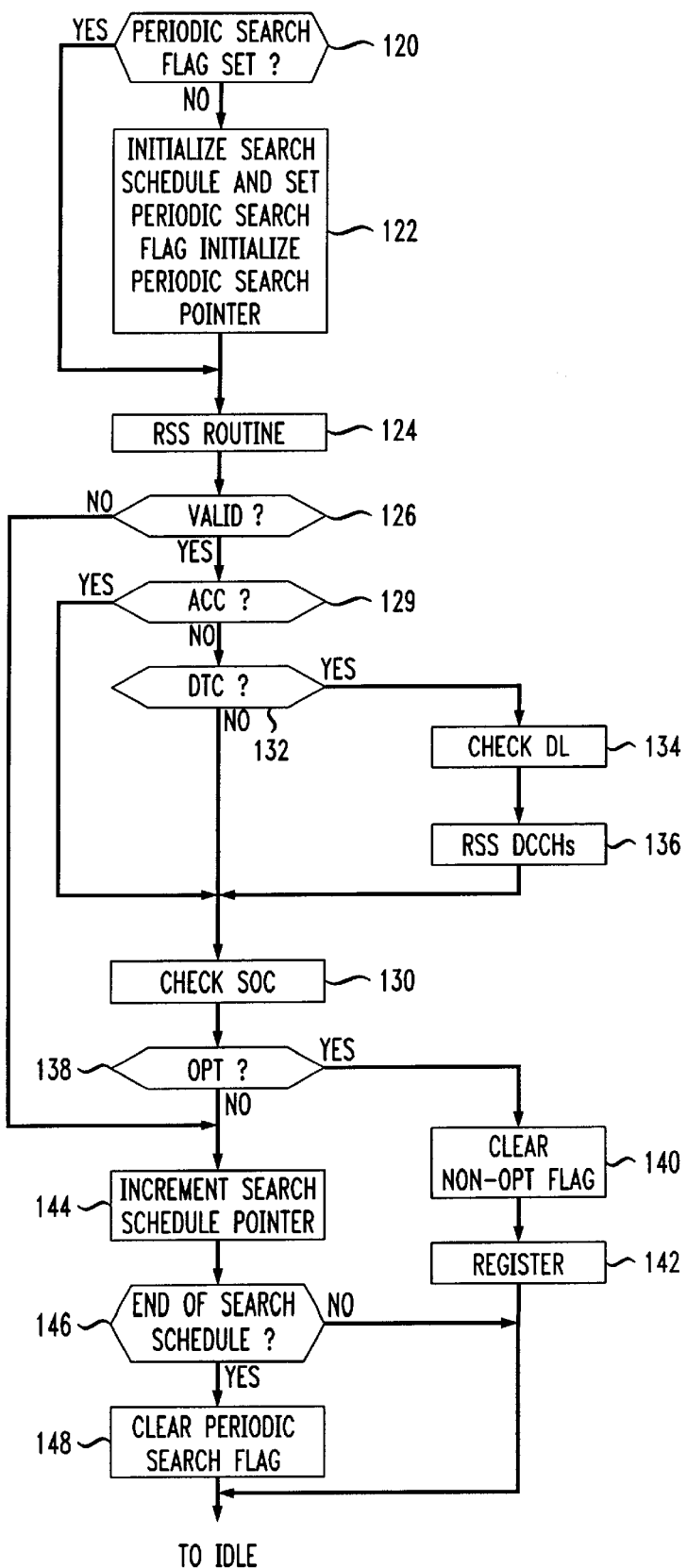
FIG. 11 is a flow chart illustrating a periodic search routine.

FIG. 11 illustrates a flowchart for the periodic search routine executed by control system 106. In step 120 -it is determined whether the periodic search flag has been set. If the periodic search flag has not been set, step 122 is executed. In step 122 the periodic search flag is set and the search schedule is initialized by loading the master search schedule into the search schedule used by the periodic search routine; however, the frequency band currently being received is not included in the search schedule used for the periodic search routine. Step 122 also sets a search pointer to the first band in the search schedule.

In step 124 a received signal strength search (RSS) routine is conducted. As in step 79 of the global spectrum search routine of FIG. 10, step 124 is an RSS routine of any PCS and cellular bands that are in the search schedule. In the case of a cellular band search, the 21 ACCs are searched using a received signal strength search, i.e., the transceiver tunes to the strongest ACC. In the case of a PCS frequency band search, as discussed earlier, each band is broken into segments of approximately 2.5 MHz. where a search of each segment is conducted in 30 kilohertz steps. The strongest signal within the 2.5 MHz segment and above a minimum threshold, such as −110 dBm, is selected. In step 126, the selected signal is examined to determine if it is valid by conforming to one of the previously referenced standards. If the signal is invalid, step 144 is executed and if the signal is valid, step 129 is executed. Step 129 determines whether the signal is an ACC. If the signal is an ACC, step 130 is executed where the SOC or SID is extracted and if the signal is not an ACC, step 132 is executed. Step 132 determines whether a DTC signal has been received. If the signal is not a DTC signal (therefore it is a DCCH signal), step 130 is executed to extract the SOC or SID from the DCCH signal. If in step 132 it is determined that a DTC has been received, step 134 is executed to extract the DL to enable tuning to a DCCH. In step 136 a received signal strength search is conducted of the DCCHs where the strongest signal is selected, and then step 130 is executed to extract an SOC or SID from the signal.

In step 138 it is determined whether the SOC or SID is an optimal SOC or SID. If the SOC or SID is optimal, step 140 clears the non-optimal flag and in step 142 the mobile communication device registers with the service provider associated with the optimal SOC or SID. Step 40 of FIG. 9 is then executed to enter the idle state. If in step 138 it is determined that the SOC or SID was not an optimal service provider, step 144 is executed. In step 144 the search pointer is incremented to the next band to be searched.

In step 146, it is determined whether the entire search schedule has been completed. If the schedule has not been completed, step 40 is executed so that the mobile communication device can be returned to the idle state. If in step 146 it is determined that the search schedule has been completed, step 148 clears the periodic search flag and then step 40 is executed so that the mobile communication device can enter the idle state.

Figure 12:
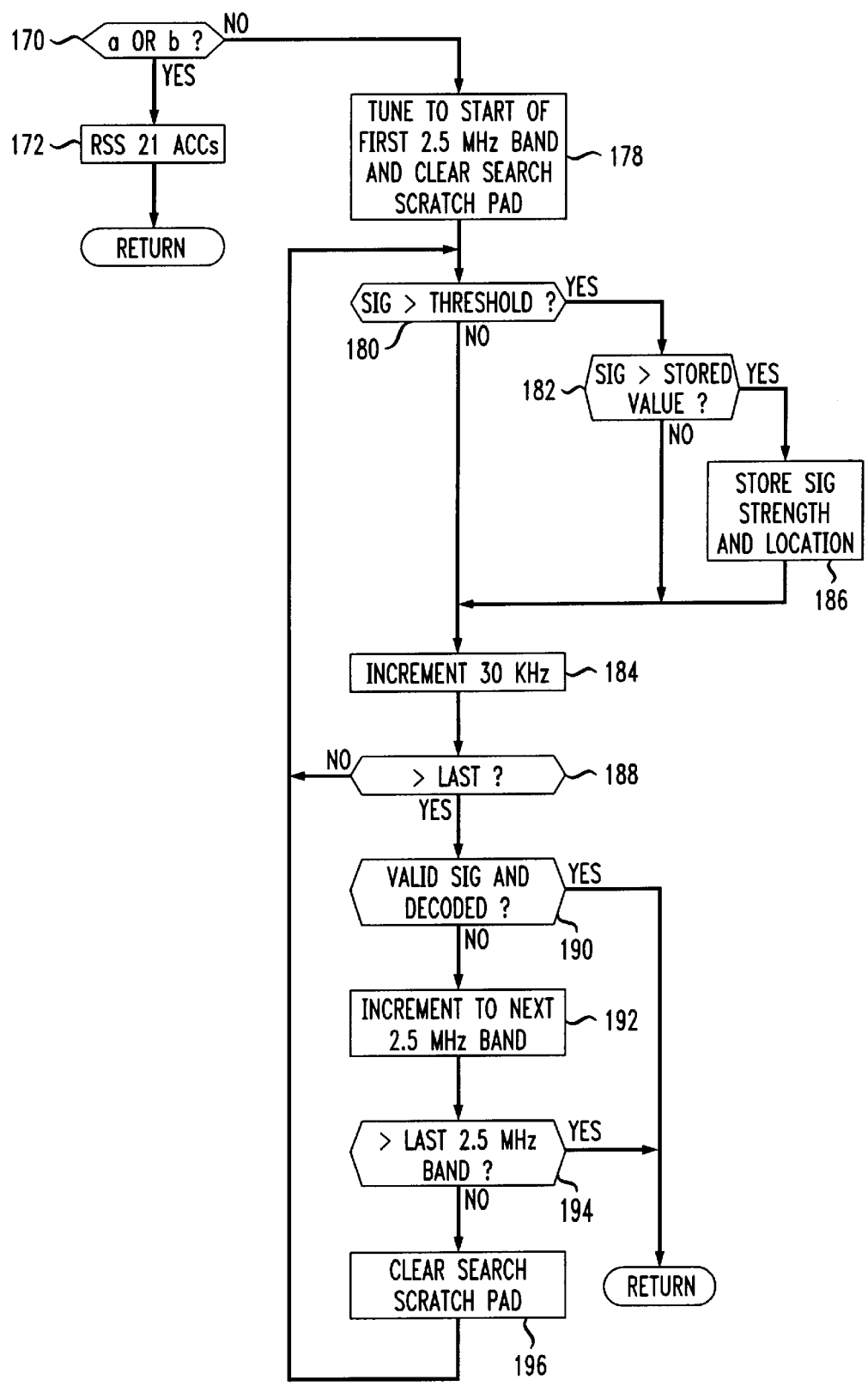
FIG. 12 is a flow chart illustrating a received signal search routine.

FIG. 12 illustrates a flow chart of the RSS routine, or received signal strength search routine, which 'is carried out, for example, in steps 79 of FIG. 10 and 124 of FIG. 11. Step 170 determines whether the band being searched is one of the "a" or "b" cellular bands. If a cellular band is being searched, step 172 is executed where the 21 ACCs are searched to determine which is the strongest. Transceiver 12 tunes to the strongest ACC under the control of control system 106 and then the RSS routine is exited. If in step 170 it is determined that a cellular band is not being searched, step 178 tunes transceiver 12 to the beginning of the first 2.5 MHz band in the PCS band being searched. Step 178 also clears a search scratch pad memory location in memory 16. The search scratch pad is used to record, the amplitude or strength and location of a received signal.

In step 180 it is determined whether the signal being received is greater than a threshold. If the signal is greater than the threshold, step 182 is executed, if the signal is not greater than the threshold, step 184 is executed. In step 182 it is determined whether the received signal strength is greater than the signal strength value stored in the search scratch pad. If the received signal is not greater, then step 184 is executed. If the received signal strength is greater, step 186 is execrated and the present signal strength is recorded in the search scratch pad with the received signal's location in the spectrum.

In step 184, transceiver 12 is tuned to a frequency 30 kilohertz higher than the frequency at which it was tuned. Step 188 determines whether the new frequency extends beyond the 2.5 MHz band currently being searched. If the new frequency does not exceed the 2.5 MHz band, step 180 is executed to once again examine the received signal strength relative to the signal strength or amplitude value stored in the search scratch pad. If in step 188 it is determined that the 30 kilohertz increment extends beyond the 2.5 MHz band being examined, step 190 is executed.

In step 190, the transceiver tunes to the signal location specified in the search scratch pad. If the signal is a valid signal and can be decoded, the RSS routine is exited. If the signal is not valid or cannot be decoded, e.g., the signal does not conform to the above-referenced standards, step 192 is executed. In step 192, the transceiver is tuned to the beginning of the next 2.5 MHz band within the PCS band being searched. Step 194 determines whether the new 2.5 MHz. band extends beyond the PCS band currently being searched. If the new increment extends beyond the PCS band being searched, the periodic search routine is exited. If the 2.5 MHz increase does not result in extending beyond the PCS band being searched, step 196 is executed. In step 196, the search scratch pad containing signal strength measurements and signal location information is cleared to prepare for searching another band. After step 196, step 180 is executed as described above.

FIG. 5 illustrates a master search schedule. The master schedule is used to initialize search schedules used in the above described search routines. The master search schedule is stored in a memory such as memory 108. The master search schedule can be initially programmed by the mobile communication device's manufacturer, distributor or user. It should be noted that the first location in the search schedule may be left unprogrammed. If left blank, the blank is ignored when initializing the search schedules for the search routines. It is desirable for the first location to be programmed with the band in which the user's home service provider resides. For example, if the user has a service agreement with a service provider who is licensed to operate in PCS band B within the SID or geographical area in which the user most frequently is located, band B is programmed into the first slot of the master search schedule. If, for example, band B is programmed in the first slot, the slot originally containing band B is made blank. This avoids searching the same band twice.

The master search schedule may be reprogrammed using signals received over the wireless communication channel. For example, the mobile communication device may be restricted to accepting new programming for the master search schedule only from a service provider transmitting the home SID and an optimal SOC. It is also possible to accept over the air programming if the service provider sends a prearranged code. It is desirable to restrict the over the air programming through the use of codes, home SIDs and/or optimal SOCs to avoid unintentional or undesirable altering of the master search schedule. Over the air programming may be implemented using for example, logical sub-channels of a digital control channel. The logical sub-channels have the capability to transmit data addressed to a particular mobile communication device and to receive data, such as confirmation data, from the mobile communications device.

When the search schedules are initialized using the master search schedule, it is also possible to precede the first location in the master search schedule with other frequency bands based on, for example, the prior history of the mobile communication devices use. For example, the first location searched may be the location where the phone was last turned off (powered down) or the location where the phone was last turned on (powered up). Such personal use information for the subscriber may be stored at the subscriber's HLR in the wireless telecommunications network.

Advantageously, the master search schedule may be reprogrammed by the wireless telecommunications network with search schedules optimized for the geographic location in which the mobile communications device last registered. For example, if a New York based subscriber was roaming and registered in Chicago, the HLR for the subscriber would provide a search schedule to be downloaded to the mobile communications device with search information particular to the midwest.

In one aspect of this invention, the frequency band search schedule may be defined based upon supervision of the search process by the wireless telecommunications network. By this method, the wireless telecommunications network 80 may provide, develop, and maintain a table in HLR 92 for a counter associated with each frequency band in the master search schedule. For example, while roaming, each time the mobile communication device 100 acquires service from a preferred provider, the counter value associated with the frequency band is incremented thereby retaining information establishing a "personal roaming history" for the user. The wireless telecommunications network then downloads these counter values to the mobile communications device to alter the order of search of the frequency bands of the master search schedule.

FIG. 6 illustrates a table stored in HLR 92 providing a counter associated with each frequency band in the master search schedule of FIG. 5. Based upon the counter values in the table, the frequency band with the highest registration success rate as defined by its associated counter value would follow the home frequency band in the master search schedule. Thereafter, each additional frequency band with a non-zero counter would follow, according to its counter value, from highest to lowest. Frequency bands with a counter value of zero would then follow non-zero entries in their originally defined order.

As preferably embodied, the counter associated with each frequency band should store only a finite number of registrations, e.g., 10, to keep storage requirements in HLR 92 to a minimum. Additionally, the stored counter values may represent time-weighted registrations with more weight given to the most recent registrations. Advantageously, such time weighting of the counter values will serve to optimize search efficiency.

It will be appreciated that the occasion may arise when the master search schedule needs to be reset and the order of search may be redefined and the counter values zeroed by any of the previously discussed programming methods.

Figures 7, 8:
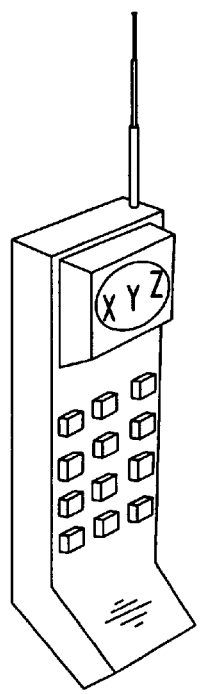
FIG. 7 illustrates a prioritized list of service providers.
FIG. 8 illustrates display of an alphanumeric tag on a mobile communication device.

FIG. 7 illustrates a table stored in HLR 92 defining the optimal service provider's SOC and SIDs, and preferred service provider's SOCs and SIDs. The SOC or SID with the lowest number has the highest priority and is preferred over service providers with higher numbers and therefore a lower priority. For example, an SOC or SID with a priority level 2 would be preferred over an SOC or SID with a priority level of 5. The table may also include SOCs or SIDs that are undesirable or prohibited. In the case of SOCs or SIDs that are prohibited, it is desirable to permit connection to the prohibited SOCs or SIDs when an emergency call, such as a 911 call, is attempted or when the user enters an override command. The table in FIG. 7 may be programmed by the manufacturer, by the distributor when the phone is purchased or by the user. It is also possible to program the table of FIG. 7 over the air using restrictions similar to those used when programming the master search schedule over the air.

Multiple service provider categories may be identified by matching the SID or SOC broadcast on a control channel with the entries in the table of FIG. 7. These categories may include:

(1) home—service provider of choice and normally the service provider with whom the user has a service agreement. If a mobile communication device is registered on or finds a control channel for a home service provider, the device does not attempt to find service on any other frequency band.

(2) partner—a partner with the home service provider. If a mobile communication device is registered on or finds a control channel for a partner service provider, the device does not attempt to find service on any other frequency band.

(3) preferred—a service provider with whom the home service provider has a preferential rate and/or service agreement. The mobile communication device will register with a favored service provider only if a home or partner service provider is not found. On the occurrence of certain events, such as a control channel change and/or periodically, the mobile communication device will search other frequency bands for a home or partner service provider.

(4) forbidden—a service provider which is never used under normal circumstances.

(5) neutral—a service provider not identified by a SID or SOC entry in the table of FIG. 7. The mobile communication device will register on a neutral service provider if none of home, partner, or preferred service providers are found. On certain events such as a control channel change and/or periodically, the mobile communication device will search other frequency bands for a home, partner, or preferred service provider.

In alternative embodiments of the invention, "alpha tags", which are stored in HLR 92, may be displayed on a mobile communication device identifying a particular service class while the mobile communication device is in idle or camping mode. The alpha tags can be programmed or changed as part of over the air activation or over the air programming as previously disused and stored in memory 108 of the mobile communications device. In an instance where XYZ is the home service provider, the alpha tags could be:

(1) home—"XYZ"
(2) partner—"XYZ partner"
(3) preferred—"XYZ preferred"
(4) neutral—"ROAMING"

Existing standards allow for the broadcast of an alpha tag on a control channel and its display on a mobile communication device when in the idle or camping state. For instance, if a mobile communication device used by an XYZ subscriber was in an ABC market, the phone might display "ABC". The system described herein, however, would allow the home service provider XYZ to control the mobile communication device to display "XYZ" as illustrated in FIG. 8. Further, alpha tags could be updated as marketing requirements dictate.

Intelligent Roaming Using Network Gathered Information

One aspect of this invention is an improved intelligent roaming technique in which information gathered by the wireless network is used to formulate an optimal search schedule, such as the exemplary Master Search Schedule identified in FIG. 5. The invention contemplates the design of optimal intelligent roaming search schedules using the types of information that are currently gathered by the network. However, additional information, that the network may be designed to gather in the future, may also be used in the practice of this invention.

The invention will be better understood, by recognizing that the information that is used to design the search schedule for a specific subscriber generally falls into two broad classes. First there is information related to the subscribers last registration on the system. This information may include subscriber location as well as information related to the provider used during the last registration and the services sought. A second class of information relates to projecting where the subscriber will be at the next power-up. This information relates to past practices of the specific subscriber, as well as past practices of other subscribers or subsets of subscribers. This "projection" information can be analyzed based on many variables, such as last location of the subscriber, last call made by the subscriber, time of day and year, recent movement of the subscriber, historical practices of the specific subscriber, etc.

In accordance with one aspect of this invention, the information that may be used to design intelligent roaming search schedules may be related to the usage history of the particular subscriber. For example, information related to previous registrations for the particular subscriber will show that when the subscriber is near the local airport the next registration location for that particular subscriber is usually a specific distant city. Clearly, the network information is reflecting the fact that the subscriber often flies from the local airport to the specific distant city. A search schedule that takes into account the frequency assignments of the subscriber's service providers in the specific distant city will then be used. Alternatively, the subscriber may fly to any one of a number of distant cities, and, in that situation, information reflecting the frequency assignments all of those service providers may be used in designing a search schedule.

The information that is most applicable to the design of a search schedule at any given time may be further narrowed by using additional information available to the network. For example, network information may show that on a holiday weekend when the subscriber is near the local airport, the subscriber's wireless communication device next tries to register at a particular resort location. The search schedule can then take that information into account, if the current time is that holiday weekend. Under such circumstances, the optimum search schedule will first seek the subscriber's preferred service providers at the resort location.

In accordance with another aspect of this invention, the information that may be used to design intelligent roaming search schedules may be related not only to the usage history of the particular subscriber but to the usage history of other subscribers as well. For example, the network will know that subscribers on a particular interstate highway, when reaching the state boundary, will most often make their next call from the adjacent state. Clearly, the network information reflects the fact that this highway crosses a state boundary entering into another geographic network with a different set of communication parameters, such as SOCs, SIDs, operating frequencies, and even available service providers. A search schedule that reflects the frequency assignment of service providers in the adjoining areas of the adjacent state will then be used. Similarly, in other embodiments of the invention, information related to the usage history of subsets of subscribers may be used to design efficient search schedules.

In these and other embodiments of the invention, information gathered by the network permits more rapid selection of an optimum service-provider in a multi service-provider environment. Access to network information for the design of intelligent roaming search schedules, in accordance with this invention, not only provides information that is not usually available to the subscriber for designing search schedules, but, to the extent that such information results in more efficient search schedules, helps overcome storage and processing limitations of mobile communication devices when seeking an optimum service provider in a multi service-provider environment.

Although in the broad practice of this invention the search schedule is designed based on information gathered in the network, the schedule itself need not be designed in the network. Accordingly, in some embodiments of the invention, the search schedule may be designed in the subscriber phone, but based on the network information Of course, in other embodiments, the search schedule may be designed in a network element, or in a non-network element removed from the phone. The information and/or the search schedule may be transferred to the phone over-the-air or manually.

In some embodiments of the invention, the subscriber may provide information that will help in the design of the search schedule. For example, the subscriber can indicate the location of the next power-up and the network can then select with certainty the information that would provide an optimum search schedule for that power-up, rather than relying on information that only permits a statistical projection of the location of the next power-up. Likewise, once the communication device has registered in a new location, search related information that is not useful, based on the new location may be removed from the communication device to save memory and other resources.

In view of the limited memory available in the phone, the search schedule may be updated periodically depending on the projected location of the phone. Accordingly, for example, certain bands may be removed from the search schedule based on the projected location of the phone. Alternatively, the user may indicate to the network the location of the phone, and based on the network information related to that new location, a search schedule customized for that location may be used.

Many wireless networks are currently configured to gather information for billing, fraud prevention and other purposes. That information also relates to usage and may be useful in intelligent roaming. Accordingly, in an embodiment of the invention, that information is used to configure a search schedule.

In FIG. 3 there is an illustrative schematic of a Data Message Handler (DMH) that gathers information from various geographic networks that may be used in intelligent roaming. As shown in the Figure a plurality of cellular networks may joined in a cooperative North American Cellular Network (NACN) High Speed Data Network (HSDN). Currently, the NACN establishes and abides by various standard protocols and procedures. As part of the NACN, for example, there may be an agreed upon procedure for gathering "Activity Records" reflecting information related to all cellular calls. This information may include, for each call, the identity and location of each calling and called party, the length of the call, the date and time of the call, cells traversed during the call, etc. As shown in the Figure, this information is used, for example, for billing purposes, and, when further analyzed, to detect fraud. This further analysis necessary for detection of fraud usually involves study of the mobility characteristics of the subscriber and comparing that analysis to historical patterns for that subscriber or to reasonable movement rates. So, for example, if a subscriber makes a call from New York at one moment, and then shortly thereafter makes a call from San Francisco, it is likely that one of the calls originated with a fraudulently cloned transceiver.

The very same information that may be gathered by the network in, for example, the DMH, may be used to configure a search schedule that is used during registration to select a service provider. Accordingly, in an illustrative embodiment of the invention, an Intelligent Roaming Network Intelligence Unit (IRNI) receives at least some of the same information that is used by the Fraud Detection Unit. In simpler embodiments of the invention this information is used to construct a search schedule that simply searches first for the SOC and SID that were used by the subscriber.

In one embodiment of the invention, the information used to design a search schedule may include information relating to service providers preferred by the subscriber in particular geographic location on previous transmissions. The search schedule designed by the device or the network can then look for such service providers on a priority basis when in the appropriate geographic location. Updated information or search schedules may be downloaded, manually or over-the-air, every time the subscriber powers up or after a given number of power-ups.

In still other embodiments, the inventive method may be used when an already powered-up phone is approaching another Wireless Geographic Network. In accordance with this embodiment, the phone is instructed to transfer to a SOC and SID of a preferred service provider in the new Wireless Geographic Network when the boundary is crossed.

It will be appreciated that the invention takes advantage of the information the wireless telecommunications network maintains on subscriber locations, band registrations, carriers, etc., to find an optimal frequency for a mobile Communications device. In particular, when the mobile communications device is turned on, the device may switch to intelligent roaming procedures and register with the best carrier available. The wireless telecommunications network may then update the stored information in the mobile communications device to optimize future searches.

It will also be appreciated that the invention overcomes significant limitations of the mobile communications device in intelligent roaming applications. More particularly, such devices are restricted in the amount of memory provided. Thus, optimized search schedules cannot be provided for all possible scenarios that the subscriber may encounter. The instant invention shifts the burden of maintaining the information to the wireless telecommunications network, and may involve downloading only the immediately pertinent information, thereby permitting operation of the mobile communications device with substantially less memory. While the invention has been described in its preferred embodiments, it is to be understood that the words which have been used are words of description, rather than limitation, and that changes may be made within the purview of the appended claims without departing from the true scope and the spirit of the invention in its broader aspects.

What is claimed:

1. A method for determining a selection of a particular operating frequency band from among a plurality of available operating frequency bands in a frequency band search schedule comprising a plurality of items listed in a predetermined order, the frequency band search schedule being used by a wireless communication device operating on a wireless communication network in a multi-service provider environment, comprising:
   a) predicting a future location of the wireless communication device based on information gathered by the network; and thereafter
   b) establishing a frequency band search schedule using the predicted future location.

2. The method of claim 1 wherein the future location is predicted based on registrations made by the wireless communication device with the network.

3. The method of claim 1 wherein the future location is predicted based on registrations with the network made by wireless communication devices other than the wireless communication device.

4. The method of claim 1 wherein the future location is predicted based on registrations with the network made by the wireless communication device and by wireless communication devices other than the wireless communication device.

5. The method of claim 1 wherein the items in the frequency band search schedule are selected from the group comprising of frequencies, SOCs and SIDs.

6. The method of claim 1 wherein the information includes the location of the wireless communication device during a last registration.

7. The method of claim 1 wherein the information includes an identification of a service provider that completed a last call made by the wireless communication device.

8. The method of claim 1 wherein the information includes the frequency band used during a last call made by the wireless communication device.

9. The method of claim 1 further comprising downloading the frequency band search schedule from the wireless communication network to the wireless communication device and storing the frequency band search schedule in the wireless communication device.

10. The method of claim 9 wherein the frequency band search schedule is downloaded manually.

11. The method of claim 9 wherein the frequency band search schedule is downloaded over the air.

12. The method of claim 1 further comprising designing the frequency band search schedule in the network.

13. The method of claim 12 further comprising downloading the frequency band search schedule from the wireless communication network to the wireless communication device.

14. The method of claim 13 further comprising downloading the frequency band search schedule from the wireless communication network to the wireless communication device over-the-air.

15. The method of claim 13 further comprising downloading the frequency band search schedule from the wireless communication network to the wireless communication device manually.

16. The method of claim 1 wherein the frequency band search schedule is designed outside of the wireless communication network.

17. The method of claim 1 wherein the frequency band search schedule is designed in the wireless communication device.

18. The method of claim 1, 12, 16 or 17 further comprising storing the frequency band search schedule in the wireless communication device.

19. The method of claim 1 wherein the information includes location information provided by the user of the wireless communication device.

20. The method of claim 19 wherein the location information provided by the user of the wireless communication device overrides the frequency band search schedule based on the predicted future location of the wireless communication device.

21. The method of claim 1, further comprising removing at least one frequency band from the plurality of frequency bands in the frequency band search schedule based on the predicted future location of the wireless communication device.

22. A wireless communication network that provides service to a plurality of wireless communication devices in a multi-service provider environment and determines a frequency band search schedule for selecting a particular frequency band from among a plurality of available frequency bands, the wireless communication network comprising:
   a memory that gathers usage information from the network related to usage of the wireless communication devices; and
   a processor that predicts a future location of at least one wireless communication device based on the usage information from the network, and thereafter establishes, for at least one wireless communication device, a frequency band search schedule using the predicted future location of the at least one wireless communication device.

23. A wireless communication device operating in a wireless communication network and locating a wireless service provider in a multi-service provider environment, comprising:
   a memory for storing a frequency band search schedule comprising a prioritized list of a plurality of frequency bands; and
   a processor for predicting a future location of the wireless communication device based on information gathered by the network and thereafter establishing a frequency band search schedule using the predicted future location of the wireless communication device, the processor examining the frequency band search schedule to select a particular frequency band from the plurality of frequency bands.

24. A recording medium that stores a control program for use by a wireless communication device operating on a wireless communication network in a multi-service provider environment, the control program including instructions for:
   selecting a particular frequency band from among a plurality of available frequency bands listed in a prioritized order in a frequency band search schedule; and
   predicting a future location of the wireless communication device based on information gathered by the network and thereafter establishing a frequency band search schedule using the predicted future location of the wireless communication device.

25. A method for determining a selection of a particular operating frequency from among a plurality of available operating frequencies in a frequency search schedule comprising a plurality of items listed in a predetermined order, the frequency search schedule being used by a wireless communication device operating on a wireless communication network in a multi-service provider environment, comprising:
   a) predicting a future location of the wireless communication based on information gathered by the network; and thereafter
   b) establishing the frequency search schedule using the predicted future location.

26. The method of claim 25, wherein the future location is predicted based on registrations made by the wireless communication device with the network.

27. The method of claim 25, wherein the future location is predicted based on registrations with the network made by wireless communication devices other than the wireless communication device.

28. The method of claim 25 wherein the future location is predicted based on registrations with the network made by the wireless communication device and by wireless communication devices other than the wireless communication device.

29. The method of claim 25, wherein the items in the frequency search schedule are selected from the group comprising of frequencies, SOCs and SIDs.

30. The method of claim 25, wherein the information includes the location of the wireless communication device during a last registration.

31. The method of claim 25, wherein the information includes an identification of a service provider that completed a last call made by the wireless communication device.

32. The method of claim 25 wherein the information includes the frequency used during a last call made by the wireless communication device.

33. The method of claim 25 further comprising downloading the frequency search schedule from the wireless communication network to the wireless communication device and storing the frequency search schedule in the wireless communication device.

34. The method of claim 33 wherein the frequency search schedule is downloaded manually.

35. The method of claim 33 wherein the frequency search schedule is downloaded over the air.

36. The method of claim 25 further comprising designing the frequency search schedule in the network.

37. The method of claim 36 further comprising downloading the frequency search schedule from the wireless communication network to the wireless communication device.

38. The method of claim 37 further comprising downloading the frequency search schedule from the wireless communication network to the wireless communication device over the air.

39. The method of claim 37 further comprising downloading the frequency search schedule from the wireless communication network to the wireless communication device manually.

40. The method of claim 25 wherein the frequency search schedule is designed outside of the wireless communication network.

41. The method of claim 25 wherein the frequency search schedule is designed in the wireless communication device.

42. The method of claim 25 further comprising storing the frequency search schedule in the wireless communication device.

43. The method of claim 25 wherein the information includes location information provided by the user of the wireless communication device.

44. The method of claim 43 wherein the location information provided by the user of the wireless communication device overrides the frequency search schedule based on the predicted future location of the wireless communication device.

45. The method of claim 25, further comprising removing at least one frequency from the plurality of frequencies in the frequency search schedule based on the predicted future location of the wireless communication device.

46. A wireless communication network that provides service to a plurality of wireless communication devices in a multi-service provider environment and determines a frequency search schedule for selecting a particular frequency from among a plurality of available frequencies, the wireless communication network comprising:
   a memory that gathers usage information from the network related to usage of the wireless communication devices; and
   a processor that predicts a future location of at least one wireless communication device based on the usage information from the network, and thereafter establishes, for at least one wireless communication device, a frequency search schedule using the predicted future location of the at least one wireless communication device.

47. A wireless communication device operating in a wireless communication network and locating a wireless service provider in a multi-service provider environment, comprising:
   a memory for storing a frequency search schedule comprising a prioritized list of a plurality of frequencies; and
   a processor for predicting a future location of the wireless communication device based on information gathered by the network and thereafter establishing the frequency search schedule using the predicted future location of the wireless communication device, the processor examining the frequency search schedule to select a particular frequency from the plurality of frequencies.

48. A recording medium that stores a control program for use by a wireless communication device operating on a wireless communication network in a multi-service provider environment, the control program including instructions for:
   selecting a particular frequency from among a plurality of available frequencies listed in a prioritized order in a frequency search schedule; and predicting a future location of the wireless communication device based on information gathered by the network and thereafter establishing the frequency search schedule using the predicted future location of the wireless communication device.

49. A method for determining a selection of a particular operating frequency band from among a plurality of available operating frequency bands, in a frequency band search schedule comprising a plurality of items listed in a predetermined order, the frequency band search schedule being used by a wireless communication device operating on a wireless communication network in a multi-service provider environment, comprising:

a) predicting a future location of the wireless communication device based on first and second types of information gathered by the network, the first type of information related to a last registration made by the wireless communication device, and the second type of information related to usage information of prior registrations with the network made by the wireless communication device and by wireless communication devices other than the wireless communication device; and b) establishing the frequency band search schedule using the predicted future location.

50. A wireless communication network that provides service to a plurality of wireless communication devices in a multi-service provider environment and determines a frequency band search schedule for selecting a particular frequency band from among a plurality of available frequency bands, the wireless communication network comprising:

a memory that gathers first and second types of information from the network related to usage of the wireless communication devices, the first type of information related to a last registration made by one wireless communication device, and the second type of information related to usage information of prior registrations with the network made by the one wireless communication device and by wireless communication devices other than the one wireless communication device; and a processor that predicts a future location of at least one wireless communication device based on the first and second types of information from the network, and establishes, a frequency band search scheduled using the predicted future location of the at least one wireless communication device.

51. A wireless communication device operating on a wireless communication network and locating a wireless service provider in a multi-service provider environment, comprising:

a memory for storing a frequency band search schedule comprising a prioritized list of a plurality of frequency bands; and a processor for predicting a future location of the wireless communication device based on first and second types of information gathered by the network, the first type of information related to a last registration made by the wireless communication device, and the second type of information related to usage information of prior registrations with the network made by the wireless communication device and by wireless communication devices other than the wireless communication device, and establishing a frequency band search schedule using the predicted future location of the wireless communication device, the processor examining the frequency band search schedule to select a particular frequency band from the plurality of frequency bands.

52. A recording medium that stores a control program for use by a wireless communication device operating on a wireless communication network in a multi-service provider environment, the control program including instructions for:

selecting a particular frequency band from among a plurality of available frequency bands listed in a prioritized order in a frequency band search schedule; predicting a future location of the wireless communication device based on first and second types of information gathered by the network, the first type of information related to a last registration made by the wireless communication device, and the second type of information related to usage information of prior registrations with the network made by the wireless communication device and by wireless communication devices other than the wireless communication device; and establishing the frequency band search schedule using the predicted future location of the wireless communication device.

53. A method for determining a selection of a particular operating frequency from among a plurality of available operating frequencies in a frequency schedule comprising a plurality of items listed in a predetermined order, the frequency search schedule being used by a wireless communication device operating on a wireless communication network in a multi-service provider environment, comprising:

a) predicting a future location of the wireless communication device based on first and second types of information gathered from the network, the first type of information related to a last registration made by the wireless communication device, and the second type of information related to usage information of prior registrations with the network made by the wireless communication device and by wireless communication devices other than the wireless communication device; and b) establishing the frequency search schedule using the predicted future location, the frequency search schedule comprising a plurality of items listed in a predetermined order.

54. A wireless communication network that provides service to a plurality of wireless communication devices in a multi-service provider environment and determines a frequency search schedule for selecting a particular frequency from among a plurality of available frequencies, the wireless communication network comprising:

a memory that gathers first and second types of information from the network related to usage of the wireless communication devices, the first type of information related to a last registration made by one wireless communication device, and the second type of information related to usage information of prior registrations with the network made by the one wireless communication device and by wireless communication devices other than the one wireless communication device; and a processor that predicts a future location of at least one wireless communication device based on the first and second types of information from the network, and establishes, for at least one wireless communication device, the frequency search schedule using the predicted future location of the at least one wireless communication device.

55. A wireless communication device operating on a wireless communication network and locating a wireless service provider in a multi-service provider environment, comprising:

a memory for storing a frequency search schedule comprising a prioritized list of a plurality of frequencies; and a processor for predicting a future location of the wireless communication device based on first and second types of information gathered by the network, the first type of information related to a last registration made by the wireless communication device, and the second type of information related to usage information of prior registrations with the network made by the wireless communication device and by wireless communication devices other than the wireless communication device, and establishing the frequency search schedule using the predicted future location of the wireless communication device, the processor examining the frequency search schedule to select a particular frequency from the plurality of frequencies.

56. A recording medium that stores a control program for use by a wireless communication device operating on a wireless communication network in a multi-service provider environment, the control program including instructions for:

selecting a particular frequency from among a plurality of available frequencies listed in a prioritized order in a frequency search schedule, predicting a future location of the wireless communication device based on first and second types of information gathered by the network, the first type of information related to a last registration made by the wireless communication device, and the second type of information related to usage information of prior registrations with the network made by the wireless communication device and by wireless communication devices other than the wireless communication device and establishing the frequency search schedule using the predicted future location of the wireless communication device.

* * * * *